US011215632B2

(12) United States Patent
Classen et al.

(10) Patent No.: US 11,215,632 B2
(45) Date of Patent: Jan. 4, 2022

(54) MICROMECHANICAL INERTIAL SENSOR

(71) Applicant: Robert Bosch GmbH, Stuttgart (DE)

(72) Inventors: Johannes Classen, Reutlingen (DE); Lars Tebje, Reutlingen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 16/748,911

(22) Filed: Jan. 22, 2020

(65) Prior Publication Data

US 2020/0241035 A1    Jul. 30, 2020

(30) Foreign Application Priority Data

Jan. 24, 2019  (DE) .......................... 102019200839.9

(51) Int. Cl.
*G01P 15/18* (2013.01)
*G01P 15/125* (2006.01)
*G01P 1/00* (2006.01)

(52) U.S. Cl.
CPC .............. *G01P 15/125* (2013.01); *G01P 1/00* (2013.01); *G01P 15/18* (2013.01)

(58) Field of Classification Search
CPC ....................................................... G01P 15/125
USPC ..................................................... 73/514.32
See application file for complete search history.

(56) References Cited

U.S. PATENT DOCUMENTS

| 2010/0242603 | A1* | 9/2010 | Miller | ................ G01P 15/125 |
| | | | | 73/514.32 |
| 2010/0281980 | A1* | 11/2010 | Yazawa | ............... G01P 15/0802 |
| | | | | 73/514.32 |
| 2011/0023606 | A1* | 2/2011 | Burghardt | ............ G01P 15/125 |
| | | | | 73/514.32 |
| 2011/0113880 | A1* | 5/2011 | Schmid | ................ G01P 15/131 |
| | | | | 73/514.01 |

FOREIGN PATENT DOCUMENTS

| DE | 102008017156 A1 | 10/2009 |
| DE | 102008001442 A1 | 11/2009 |
| DE | 102012200740 A1 | 5/2013 |

* cited by examiner

*Primary Examiner* — Walter L Lindsay, Jr.
*Assistant Examiner* — Philipmarcus T Fadul
(74) *Attorney, Agent, or Firm* — Norton Rose Fulbright US LLP; Gerard Messina

(57) ABSTRACT

A micromechanical inertial sensor, having a substrate; and a seismic mass which is connected to the substrate and developed so that it has a detection capability of a low-g acceleration of approximately 1 g in a first Cartesian coordinate direction, and the seismic mass is furthermore developed so that it has a detection capability of a high-g acceleration of at least approximately 100 g in at least one second Cartesian coordinate direction.

13 Claims, 6 Drawing Sheets

MICROMECHANICAL INERTIAL SENSOR

CROSS REFERENCE

The present application claims the benefit under 35 U.S.C. § 119 Of German Patent No. DE 102019200839.9 filed on Jan. 24, 2019, which is expressly incorporated herein by reference in its entirety.

FIELD

The present invention relates to a micromechanical inertial sensor. In addition, the present invention relates to a method for producing a micromechanical inertial sensor.

BACKGROUND INFORMATION

Microelectromechanical acceleration sensors (MEMS acceleration sensors) are currently used in numerous applications, e.g., in the automotive or the consumer field. The multitude of applications requires a precise acceleration measurement in the range of a few g (multiples of the gravitational acceleration) using what is known as "low-g sensors". They are employed in particular in consumer applications (smartphones, tablets, etc.). The automotive sector uses not only low-g sensors such as in a driving dynamics control, but also what are known as high-g sensors which, for example, detect accelerations in the range of at least 100 g that occur during the triggering of an airbag.

Generally, it is provided to develop separate sensors for each of the ranges. The performance requirements of low-g sensors with regard to offset and sensitivity errors and also noise are typically very high whereas the requirements for high-g sensors may be slightly lower. High-g sensors must predominantly provide a high dynamics range without electrical or mechanical clipping.

MEMS acceleration sensors are made up of movable masses which are suspended on springs and electrodes for the movement detection. Depending on the detection direction, this may involve linear (e.g., x, y) movements or also rotary movements (e.g., in the z-direction). German Patent Application No. DE 10 2008 001 442 A1 describes a sensor which can detect accelerations in all three directions in space (x, y, z) using a single, movably suspended mass and three pairs of electrodes. That particular sensor exploits the characteristic of a so-called z-rocker to respond to an acceleration in all three directions in space by an "individual" movement: a deflection in the x-direction produces a linear movement, a deflection in the y-direction produces an in-plane rotation, and a deflection in the z-direction produces an out-of-plane rotation. Below, this system will also be referred to as a "single-mass oscillator". In practice, however, ensuring an equally satisfactory performance for all three sensing directions (e.g., with regard to noise as well as offset and sensitivity errors) poses a considerable challenge. Additional suspensions and an electrical wiring of the fixed electrodes as well as special production methods, e.g., using a second micromechanical layer, were proposed in order to improve the performance of single-mass oscillators.

SUMMARY

It is an object of the present invention to provide an improved micromechanical inertial sensor.

According to a first aspect, the objective may be achieved by a micromechanical inertial sensor, which has:
a substrate; and
a seismic mass, which is connected to the substrate and developed so that it has a detection capability of a low-g acceleration of approximately 1 g in a first Cartesian coordinate direction, and
the seismic mass is furthermore developed so that it has a detection capability of a high-g acceleration of at least approximately 100 g in at least one second Cartesian coordinate direction.

This provides a micromechanical inertial sensor, which has at least one high-g channel and at least one low-g channel. The mentioned measuring sensitivities are thereby able to be integrated into a single sensor, which advantageously reduces an outlay for acceleration sensors in terms of production technology and costs.

According to a second aspect of the present invention, the objective may be achieved by a method for producing a micromechanical inertial sensor, the method having the steps:
providing a substrate,
providing a seismic mass, which is connected to the substrate and developed so that it has a detection capability of a low-g acceleration of approximately 1 g in a first Cartesian coordinate direction, and
the seismic mass is furthermore developed so that it has a detection capability of a high-g acceleration of at least approximately 100 g in at least one second Cartesian coordinate direction.

Preferred further developments of the micromechanical inertial sensor are described herein.

One advantageous further development of the micromechanical inertial sensor in accordance with the present invention includes that the seismic mass is developed in the form of a z-rocker, which is centrally connected to the substrate (see, e.g., FIG. 1, element 51) with the aid of spring elements and a connection element (see, e.g., FIG. 1, element 50), a width of the spring elements amounting to between approximately 2% and approximately 5% of a length of the spring elements. Using specific geometric measures, a high-g function is thereby combined with a low-g function in one sensor. This ultimately makes it possible for the seismic mass to detect not only accelerations in the z-direction but in the x- and y-directions as well.

Another advantageous further development of the micromechanical inertial sensor in accordance with the present invention includes that distances of x-electrodes and distances of y-electrodes from the seismic mass are specified to be larger than a distance of the z-electrodes disposed on the substrate from the seismic mass. This realizes further geometrical measures for achieving the mentioned combination of a high-g and a low-g functionality.

Another advantageous further development of the micromechanical inertial sensor in accordance with the present invention includes that the x-electrodes have an uninterrupted development across a lateral extension of the seismic mass in recesses of the seismic mass, and the y-electrodes are developed separately from the x-electrodes in recesses of the seismic mass. In this way, the accelerations in the x-direction and in the y-direction are detected by separate electrodes.

Another advantageous further development of the micromechanical inertial sensor in accordance with the present invention includes that xy-electrodes are developed in two pieces in each case across a lateral extension of the seismic mass in recesses of the seismic mass, the xy-electrodes alternately being electrically connectable in a crosswise manner. This realizes an alternative concept in which accelerations in the x-direction and in the y-direction are able to be detected using a single set of electrodes. In an advantageous manner, the sensor may thus have an even smaller size.

Another advantageous further development of the micromechanical inertial sensor in accordance with the present invention includes that the seismic mass has an asymmetrical development across a lateral overall extension, and a separate z-electrode is disposed underneath the seismic mass in regions that are situated opposite to a torsion axis in each case. This adds a z-rocker functionality to a lateral sensor for the detection of accelerations in the x-direction, so that a low-g sensor (detection in the x-direction) with a high-g sensor (detection in the z-direction) is realized in the final analysis.

Another advantageous further development of the micromechanical inertial sensor in accordance with the present invention includes that an extent of the asymmetry of the seismic mass across the lateral overall extension preferably amounts to less than approximately 30%, preferably to approximately 2% to approximately 5%, more preferably to approximately 10% to approximately 20%, and most preferably to approximately 25% to approximately 30%. A suitable specific dimension of the asymmetry is provided as a result.

Another advantageous further development of the micromechanical inertial sensor in accordance with the present invention includes that an extent of the asymmetry of the seismic mass across the lateral overall extension is developed as a function of a detection capability in the z-direction. In an advantageous manner, depending on the acceleration to be measured, the asymmetry of the seismic mass may have a specific development.

Below, the present invention is described in detail together with additional features and advantages on the basis of a plurality of figures. Identical or functionally equivalent elements have been provided with the same reference numerals. In particular, the figures are meant to illustrate main principles of the present invention and have not necessarily been drawn true to scale. For better clarity, it may thus be the case that not all reference numerals have been marked in all of the figures.

Disclosed method features similarly result from correspondingly disclosed devices features, and vice versa. This particularly means that features, technical advantages and embodiments pertaining to the micromechanical inertial sensor similarly result from corresponding embodiments, features and advantages of the method for producing a micromechanical sensor, and vice versa.

DETAILED DESCRIPTION OF EXAMPLE EMBODIMENTS

Hereinafter, "low-g" is to be understood as an acceleration value of an approximately single gravitational acceleration g, and "high-g" is to be understood as an acceleration value of at least a hundred-fold gravitational acceleration g.

A specific main idea of the present invention is to integrate the high-g functionality for the x- and y-directions into the low-g z-rocker, and the high-g functionality for the z-direction into at least one lateral sensor (x and/or y). This makes it possible to address the performance requirements of the low-g z-sensors and the low-g x- and y-sensors in a particularly advantageous manner. The high-g sensors, which are less demanding with regard to performance, are then able to be integrated into the low-g sensor structures with relatively little effort. As a whole, this facilitates a particularly compact development of multi-axes acceleration sensors that combine a low- and a high-g functionality, without any real compromises as to the achievable performance of the low-g channels.

Within the framework of an ongoing miniaturization of sensors, it may be useful to combine a low-g and a high-g functionality with each other on one chip or in one sensor package or to realize this goal using the fewest separate MEMS structures possible. In so doing, no performance compromises are to be made for the low-g channels of the sensors.

Figure 1:
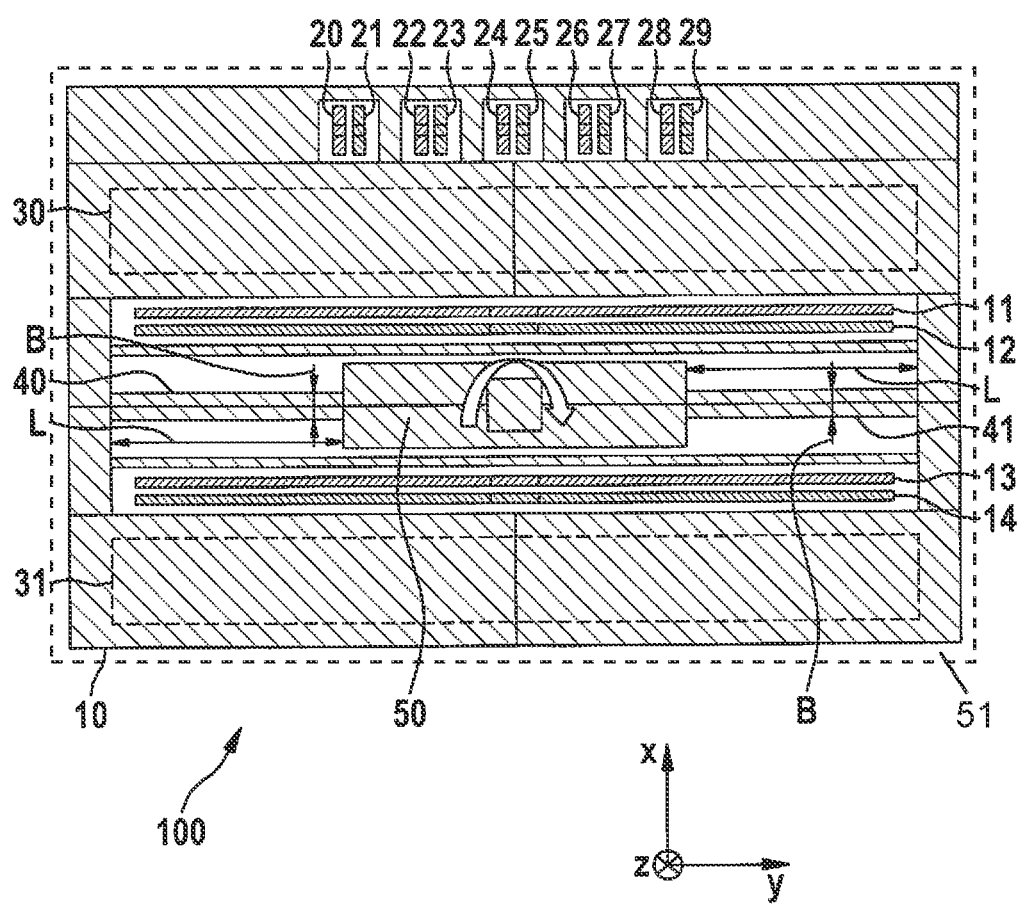
FIG. 1 shows a plan view of a seismic mass of a provided micromechanical inertial sensor.

FIG. 1 schematically illustrates the manner in which the high-g functionality for the x and y directions is able to be integrated into a z-inertial sensor 100. Seismic mass 10 in the form of a z-rocker can be seen, which is developed as a low-g element having a soft spring and a large mass for the detection of an acceleration in the z-direction. Placing the fixed x-electrodes 11-14 and fixed y-electrodes 20 . . . 29 in recesses of seismic mass 10 and a corresponding adaptation of parameters of the micromechanical inertial sensor, e.g., the spring length and width, the radius of the starting point of the spring or the electrode clearance, make it possible to achieve a high-g coordination of the x- and y-electrodes. The hatched regions represent connection points of the freely moving (under-etched) function plane to the sensor substrate (not shown). Such a structure realizes:

a) a low-g inertial sensor in the z-direction (i.e. perpendicular to the wafer plane)
b) two high-g inertial sensors in the x- and y-directions (i.e. parallel to the wafer plane).

The provided inertial sensor derives the high-g characteristics in the lateral direction from the following modifications:

Spring width: Because the spring width is taken into account to the third power in the x/y flexural rigidity and has a lesser influence on the z-channel (torsional rigidity), width B of spring elements 40, 41 should preferably amount to more than 2% of length L, which means B/L>0.02.

Electrode spacing: In order to provide the inertial sensor with a greater deflection capability for the high-g functionality in the lateral direction, electrode spacing d_lateral of the x-electrodes and the y-electrodes from seismic mass 10 should be greater than electrode spacing d_vertical between deflectable seismic mass 10 and the substrate in the z-direction, whereby the following applies:

d_lateral>d_vertical.

Deflection in response to a gravitational acceleration: the parameters mass distribution, spring width and spring length are adjusted so that the deflection of seismic mass 10 in the lateral direction (x or y) in response to an application of a gravitational acceleration is at least five times lower than in the z-direction (measured at the center point or on a center line of z-electrodes 30, 31).

It is apparent that fixed x-electrodes 11-14 and fixed y-electrodes 20-29 are developed separately from one another in the specific embodiment of micromechanical inertial sensor 100 shown in FIG. 1.

In the final analysis, a low-g z-sensor is "enriched" by high g-functionalities in the x- and y-directions through the system of FIG. 1 or combined in one inertial sensor. In this way, seismic mass 10 is not only able to move in the z-direction but also in the x- and y-directions and is therefore able to measure acceleration values. An acceleration of seismic mass 10 in the y-direction results in a rotation of seismic mass 10 about the z-axis (indicated by a rotation arrow).

Figure 2:
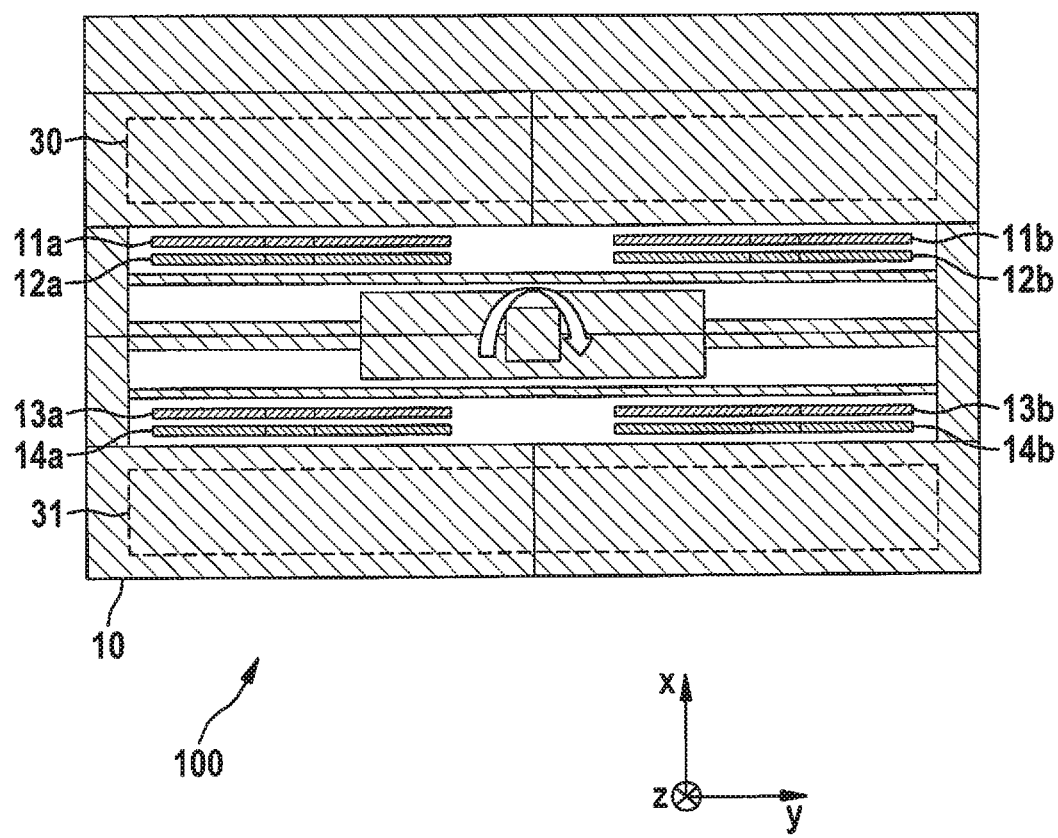
FIG. 2 shows a plan view of a seismic mass of an additional specific embodiment of a provided micromechanical inertial sensor in a first wiring state.
Figure 3:
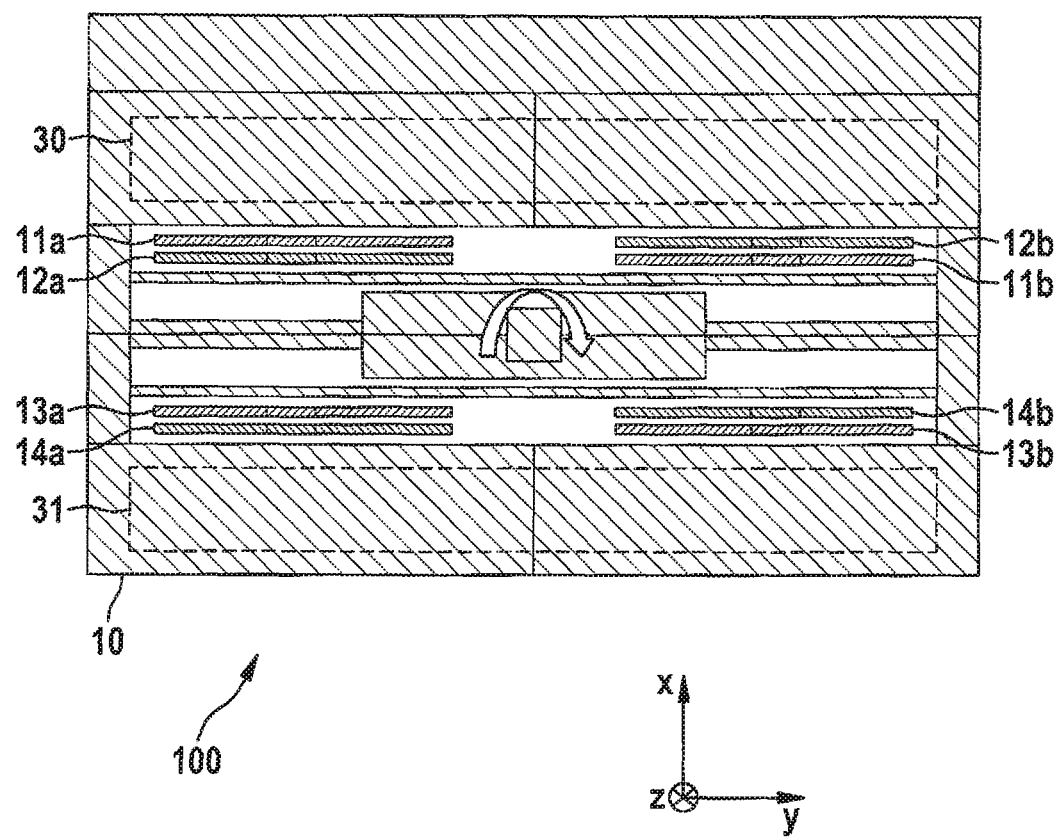
FIG. 3 shows a plan view of a seismic mass of the provided micromechanical inertial sensor from FIG. 2 in a second wiring state.

In a further embodiment of provided inertial sensor 100, the y-movement of seismic mass 10, which is an in-plane rotation, is also able to be detected with the aid of xy-electrodes 11a-14b provided they are interconnected in a crosswise manner one after the other in terms of time, as illustrated in FIGS. 2 and 3.

FIG. 2 shows an interconnection state of x-electrodes 11a-14b for the detection of an x-movement, and FIG. 3 shows an interconnection state of xy-electrodes 11a-14b for the detection of a rotary y-movement. It can be seen that the interconnection of xy-electrodes 11b, 12b and 13b, 14b in FIG. 3 has changed in comparison with the interconnection of xy-electrodes 11b, 12b and 13b, 14b in FIG. 2, which is realized with the aid of an electronic switching element (not shown) which is actuated by an ASIC.

This ultimately allows for a correct detection of capacitance changes between seismic mass 10 and xy-electrodes 11a-14b both in a deflection of seismic mass 10 in the x-direction and a deflection in the y-direction. In the final analysis, separate y-electrodes 20-29 from FIG. 1 are able to be saved in this way, which results in an even more compact design of mechanical inertial sensor 100. A single set of xy-electrodes may thus be used to detect deflections of the seismic mass in the x- and in the y-directions. In an advantageous manner, inertial sensor 100 may thereby be realized in an even more cost-effective manner since it requires less electrode surface.

The mentioned switchover or actuation of the xy-electrodes is able to be carried out in a time-multiplex method, for example, so that the inertial sensor is able to detect both deflections of seismic mass 10 in the x-direction and in the y-direction in a cyclical fashion.

Figure 4:
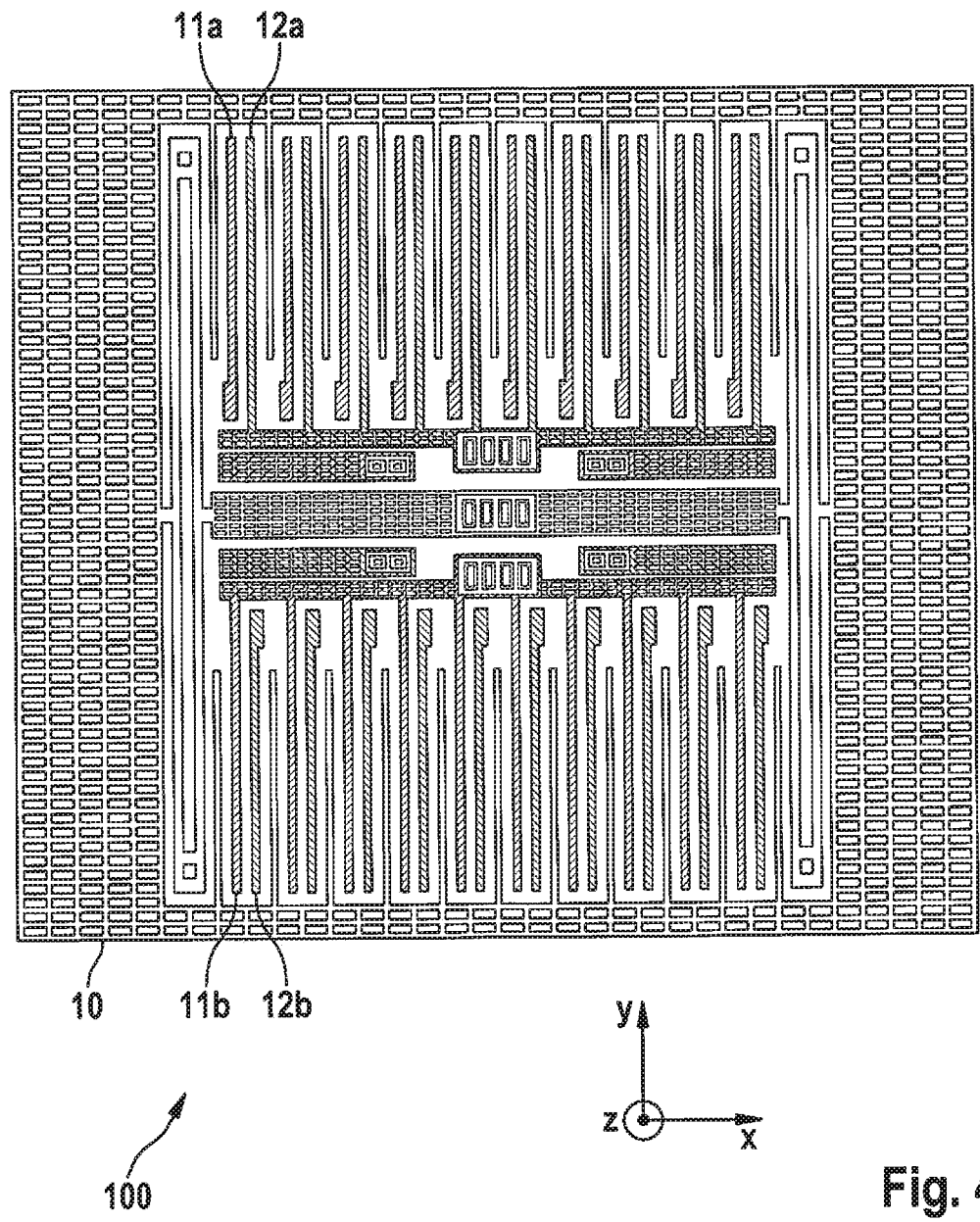
FIG. 4 shows a plan view of a seismic mass of a conventional micromechanical inertial sensor.

In one further embodiment of provided inertial sensor 100, a conventional low-g lateral sensor for the x-direction is "enriched" by a high-g functionality in the z-direction. FIG. 4 shows a conventional low-g lateral sensor in a plan view, which topologically corresponds to FIG. 5 of DE 10 2009 045 391 A1. The central structure of movable seismic mass 10 is centrally suspended. All fixed electrodes (e.g., 11a, 12a, 11b, 12b) are also situated in a region close to the center in the vicinity of the suspension of movable seismic mass 10. Two fixed mechanical stops (not shown), which restrict the maximum deflection of seismic mass 10, are situated in the larger mass regions to the left and right of movable seismic mass 10.

If an imbalance is applied to the structure, typically balanced in the z-direction, of such an x-inertial sensor, so that it reacts to a z-acceleration by an out-of-plane rotation or pitching movement, then the high-g functionality for the z-direction is obtained through the addition of z-electrodes 30, 31 (e.g., underneath the sensor, as sketched in FIG. 5) and a corresponding coordination of a supplementary mass 10a and springs. The illustration of FIG. 5 is very schematic, and in detail, it is necessary to optimize the spring geometries and the distance of the springs from the suspension point of movable seismic mass 10 in order to ensure the different mobilities and sensitivities of seismic mass 10 in the x- and z-directions.

Figure 5:
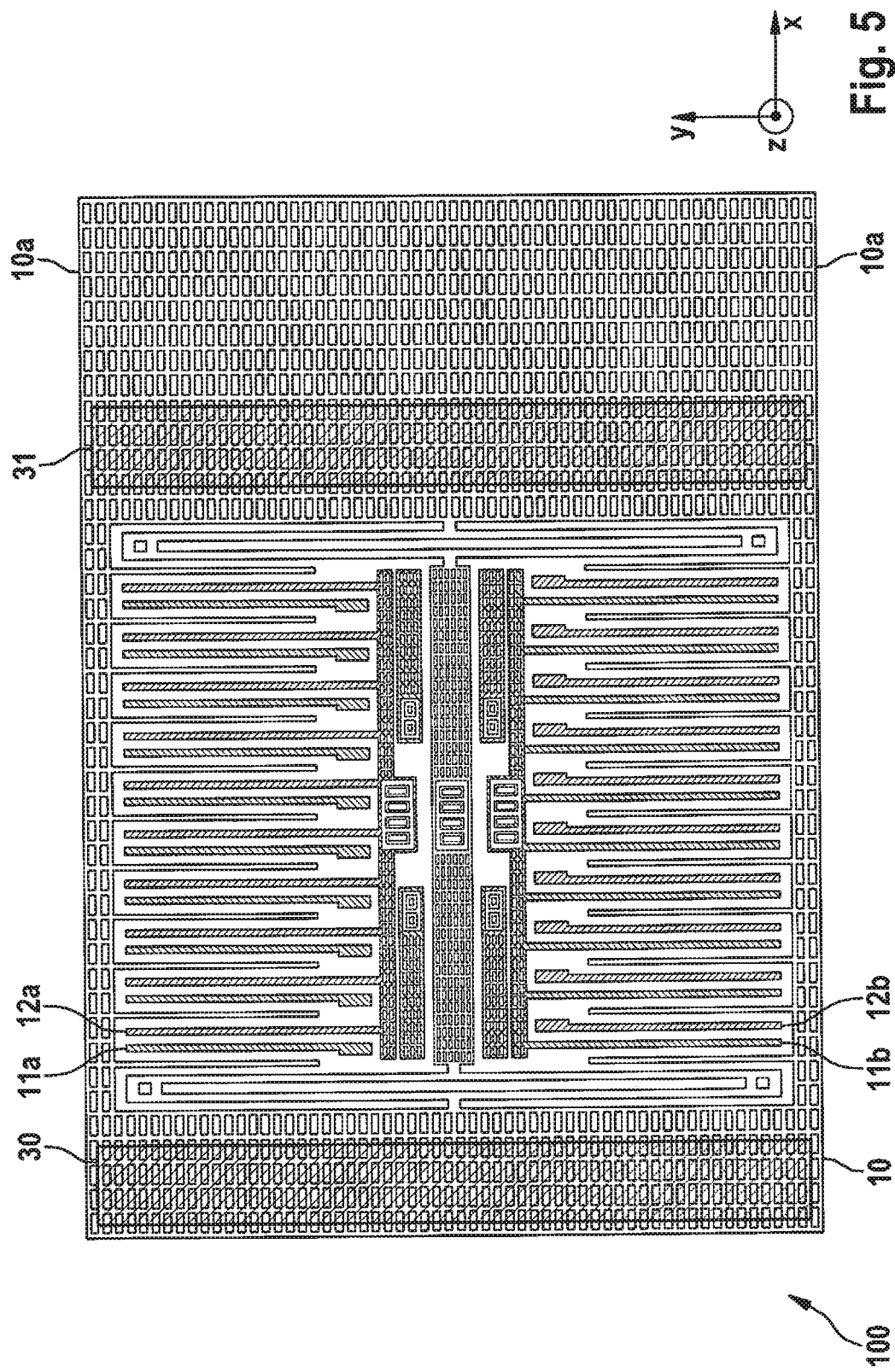
FIG. 5 shows a plan view of the seismic mass of a further specific embodiment of the provided micromechanical inertial sensor.

However, the geometrical features of provided inertial sensor 100 are very easily gathered when comparing FIG. 4 with FIG. 5:

an imbalance of seismic mass 10 in the form of a supplementary mass 10a in order to induce rocking of seismic mass 10 in response to the application of a high-g acceleration;

z-electrodes 30, 31 disposed underneath inertial sensor 100 in order to detect the rocking of seismic mass 10 in a differential manner (one side moves upwards, the other downwards).

It is of course also possible to realize the xz-functionality of inertial sensor 100 via a spring topology according to FIGS. 1, 2 and 3. To configure the x-axis to be particularly sensitive in comparison with the z-axis, an especially large spring length would have to be selected because the spring length is linearly taken into account in the torsion movement (relevant for the z-sensitivity) but to the third power in the flexural sensitivity in the x-direction. Since there are certain limits to an increase in the spring length (to keep the size of the sensor surface within reasonable limits), it is also possible to use a pleated spring, e.g., in the form of an S-shaped spring (not shown), instead of a single bar as shown in FIGS. 1 to 3. This, too, makes it possible to achieve an increase in the effective length of the spring and to obtain greater deformability in the x-direction than in the z-direction.

If two low-g lateral channels (x, y) are present and if at least one of them includes the additional high-g functionality in the z-direction, then the following results therefrom:

c) two low-g sensors in the x- and y-directions (i.e. parallel to the wafer plane)

d) one high-g sensor in the z-direction (i.e. perpendicular to the wafer plane).

Overall, using a) and b), a three-channel low-g inertial sensor (x, y, z) and a three-channel high-g inertial sensor (x, y, z) are obtained in the final analysis with the aid of only three structures that are able to oscillate. In an advantageous manner, the surface requirement is only slightly greater than that for a pure three-channel low-g inertial sensor (x, y, z) without a high-g functionality. In particular, the placement is generally slightly more compact than a lateral (side-by-side) placement of a three-channel low-g inertial sensor next to a three-channel high-g inertial sensor.

Figure 6:
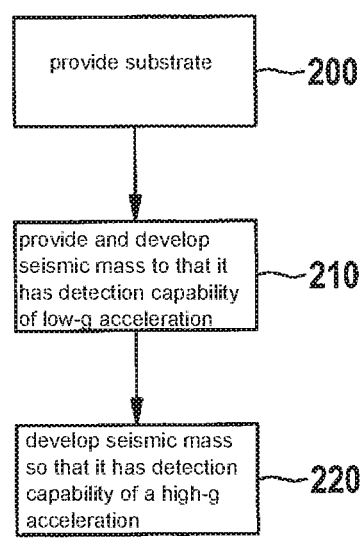
FIG. 6 shows a basic sequence of a method for producing a provided micromechanical inertial sensor.

FIG. 6 shows a basic sequence of a method for producing a provided inertial sensor.

In a step 200, a substrate is provided.

In a step 210, a seismic mass 10 is provided, which is connected to the substrate and developed so that it has a detection capability of a low-g acceleration of approximately 1 g in a first Cartesian coordinate direction z; x.

In a step 220, seismic mass 10 is developed so that it has a detection capability of a high-g acceleration of at least approximately 100 g in at least one second Cartesian coordinate direction x, y; z.

Although the present invention has been described in the previous text based on specific exemplary embodiments, one skilled in the art is also able to realize specific embodiments that were not disclosed or only partially disclosed in the above text without departing from the core of the present invention.

What is claimed is:

1. A micromechanical inertial sensor, comprising:
   a substrate; and
   a seismic mass connected to the substrate and configured so that the seismic mass has a detection capability of a low-g acceleration of 1 g in a first Cartesian coordinate direction;
   wherein the seismic mass is further configured so that the seismic mass has a detection capability of a high-g acceleration of at least 100 g in at least one second Cartesian coordinate direction;
   wherein the seismic mass is configured as a z-rocker, which is centrally connected to the substrate using spring elements and a connection element, and wherein the seismic mass surrounds the spring elements and connection element.

2. The micromechanical inertial sensor as recited in claim 1, wherein a width of the spring elements amounts to between 2% and 5% of a length of the spring elements.

3. The micromechanical inertial sensor as recited in claim 1, wherein distances from the seismic mass to x-electrodes and y-electrodes are larger than a distance of z-electrodes disposed on the substrate from the seismic mass.

4. The micromechanical inertial sensor as recited in claim 3, wherein the x-electrodes have an uninterrupted development across a lateral extension of the seismic mass in recesses of the seismic mass, and the y-electrodes are developed separately from the x-electrodes in recesses of the seismic mass.

5. The micromechanical inertial sensor as recited in claim 1, wherein xy-electrodes are developed in two pieces in each case across a lateral extension of the seismic mass in recesses of the seismic mass, the xy electrodes alternately being electrically connectable in a crosswise manner.

6. The micromechanical inertial sensor as recited in claim 1, wherein the seismic mass has an asymmetrical development across a lateral overall extension, and a separate z-electrode is disposed underneath the seismic mass in regions that are situated opposite to a torsion axis in each case.

7. The micromechanical inertial sensor as recited in claim 6, wherein an extent of asymmetry of the seismic mass across a lateral overall extension amounts to less than 30%.

8. The micromechanical inertial sensor as recited in claim 7, wherein an extent of the asymmetry of the seismic mass across the lateral overall extension is developed as a function of a detection capability in the z-direction.

9. The micromechanical inertial sensor as recited in claim 6, wherein an extent of asymmetry of the seismic mass across a lateral overall extension amounts to 10% to 20%.

10. The micromechanical inertial sensor as recited in claim 6, wherein an extent of asymmetry of the seismic mass across a lateral overall extension amounts to 25% to 30%.

11. The micromechanical inertial sensor as recited in claim 1, wherein the micromechanical sensor includes x-electrodes configured to detect of accelerations of the seismic mass in an x-direction, and includes y-electrodes configured to detect accelerations of the seismic mass in a y-direction, the x-direction being perpendicular to the y-direction, and wherein the x-electrodes are situated in first recesses of the seismic mass, and the y-electrodes are developed separately from the x-electrodes and are situated in second recesses of the seismic mass.

12. The micromechanical inertial sensor as recited in claim 1, wherein the micromechanical sensor includes xy-electrodes configured to detect accelerations of the seismic mass in an x-direction and in a y-direction, the x-direction being perpendicular to the y-direction, each of the xy-electrodes being developed in two pieces, and wherein the xy-electrodes are situated in recesses of the seismic mass.

13. A method for producing a micromechanical inertial sensor, the method comprising the following steps:
    providing a substrate; and
    providing a seismic mass which is connected to the substrate and configured so that the seismic mass has a detection capability of a low-g acceleration of 1 g in a first Cartesian coordinate direction;
    wherein the seismic mass is further configured so that it has a detection capability of a high-g acceleration of at least 100 g in at least one second Cartesian coordinate directions;
    wherein the seismic mass is configured as a z-rocker, which is centrally connected to the substrate using spring elements and a connection element, and wherein the seismic mass surrounds the spring elements and connection element.

* * * * *